March 24, 1970  D. E. LUCCI  3,502,359
JOINTING METHODS AND MEANS
Filed Nov. 24, 1967

DONALD E. LUCCI
INVENTOR.

BY Robert R. Strack
ATTORNEY

United States Patent Office 3,502,359
Patented Mar. 24, 1970

3,502,359
JOINTING METHODS AND MEANS
Donald E. Lucci, Aliquippa, Pa. 15001
Filed Nov. 24, 1967, Ser. No. 691,094
Int. Cl. E04b *1/48;* F16b *7/00, 13/00*
U.S. Cl. 287—127                     5 Claims

ABSTRACT OF THE DISCLOSURE

A blind dowel joint which precisely aligns the joined members in a predetermined, facially abutting relationship is formed by a rigid dowel which is glued and driven into complementary dowel sockets. Channels for the venting of glue and air are provided in the dowel.

BACKGROUND OF THE INVENTION

This invention relates to joining methods and means for effecting joints between separate pieces of material. More particularly, it relates to methods and means for effecting secure butted joints.

The art of cabinet construction has devised numerous techniques for joining wood and similar materials. For example, it is well known to use nails and screws, and it is also known to use various gluing arrangements in combination with internal and external supplementary pieces of material. Thus, it is customary to use glue blocks to secure shelves to the stiles, rails, and sides of a frame and it is well known to employ dowels in combination with glue as internal securing means.

The more sophisticated forms of cabinet construction make it necessary to effect the joining of the various elements of a cabinet without showing any sign of the joining means. Nevertheless, the joints should be easy to effect, and permit last minute modifications to insure accurate positioning of the elements being joined. In other words, if holes, or the like, must be bored, there should not be a need for close tolerances in either positioning or size of such holes.

Furthermore, the joint should be rigid. With respect to the method used, not only is the method of effecting the joint important; but also, the finish of the materials being joined should not be subjected to any abrasion and the joint should be secured almost immediately after assembly of the elements being joined.

For rigidity and neatness, the well-known mortise and tenon joint is often found to be of superior quality. This type of joint is both firm and rigid and when carefully prepared tends to position the joined elements in proper surface relationship. The difficulty with the kind of joint resides in the fact that the tools required to develop the tenon are cumbersome and the proper preparation of the pieces to be joined is extremely time consuming and difficult.

The use of dowels inserted in holes in each of the members to be joined is a technique sometimes employed as a substitute for the mortise and tenon joint. This latter joining technique is not entirely satisfactory because it is difficult to properly align the joined pieces, and if only one dowel is used, there is considerable risk of rotation about the axis of the dowel.

SUMMARY OF THE INVENTION

The present invention overcomes the disadvantage of the prior art joining techniques and does so in a manner that is extremely easy to use both in the shop and in the field. The components of the invention are a splined member of substantially rectangular shaped and cooperatively bored mortises adapted to receive the spline. It is relatively easy to accurately make mortises, and it is both easy and cheap to make long lengths of splined material. The combination of these elements in the manner disclosed by this invention makes possible cheap, accurate, and secure joints. This in turn leads to better and more economically produced cabinets and the like.

The features of the present invention provide means whereby the surfaces of the butt joined elements may be prepared to close tolerances and the joint itself may serve to align and position the elements. These features virtually eliminate the need for jigs when the joints are used in cabinet work and greatly facilitate fabrication of structures from pre-cut elements by unskilled labor. In addition, the splines used to complete the joints of this invention may be prepared in a manner to improve the holding ability of any adhesive used, while also making it less likely that the elements will be damaged during assembly.

It is an object of the invention to provide a new method for butt joining material.

It is a further object of the invention to provide a new method for the butt jointing of material, that can be employed irrespective of the configuration of the materials to be joined. The joint may be effected at the ends of mating pieces of material, in the face of one piece of material and the end of another, or in the ends of angularly disposed pieces of material. The only limitation on the shape of the pieces being joined is that there must be sufficient depth to accommodate the spline.

It is a further object of the invention to provide a joint wherein an independent joining member is nested within the elements to be joined and secured therein by either friction or adhesive.

In accordance with the invention there is provided a butted joint between pieces of material, comprising a mortise in the confronting faces of each of said pieces of material and an independent rigid spline having a longitudinal axis adapted to lie parallel to the axis of the mortised cavity faced when said pieces are butted and having a height and width substantially the same as the height and width of said mortises positioned therein, the height of said mortise and spline being substantially greater than the width thereof, and the longitudinal walls of said mortise and the edges of said spline being substantially parallel and continuous, said spline being of length substantially equal to the combined length of said mortises.

In accordance with another aspect of the invention there is provided a method of butt joining the edges of pieces of material, to provide a predetermined relationship between adjacent particular face surfaces of said pieces, comprising cutting oblong mortises of similar peripheral dimensions in the confronting edges of the pieces to be joined each of said mortises having substantially parallel walls, one of which is precisely positioned relative to the said particular face of the respective piece of material, inserting a spline having peripheral dimensions substantially the same as those of said mortises between said confronting edges, and bringing said confronting edges into butting contact.

Further objects and features of the invention will be obvious after consideration of the following description which is made in conjunction with the drawings wherein:

DESCRIPTION OF THE PREFERRED EMBODIMENTS

Figure 1:
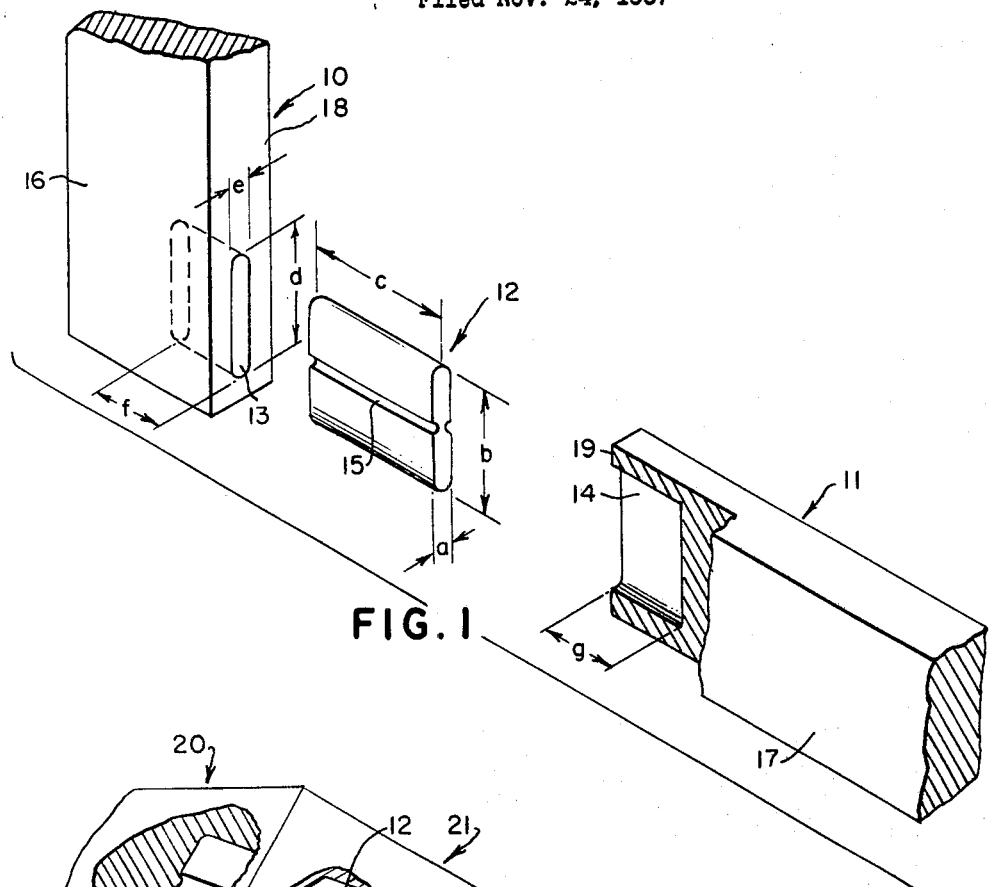
FIGURE 1 is an exploded view of a typical butt joint, with a portion of one element cut away, in accordance with the invention.

As illustrated in FIGURE 1, the basic components involved in forming a joint according to the present invention include the elements to be joined 10 and 11, and a spline 12. For purposes of discussion, it may be noted that the invention is particularly applicable to the joining of wooden materials. Nevertheless, it should be understood that other materials are within the contemplation of the invention and may partake of the advantages afforded by the invention. The spline 12 may be made of wood, plastic or any similar material which is capable of being prepared in a rigid form suitable for insertion in a manner described hereinafter. It is particularly convenient to prepare long lengths of spline material and cut off individual pieces as desired.

In order to prepare the joint, the confronting surfaces 18 and 19 of elements 10 and 11 are smoothed and configured to appropriately conforming contours. Generally, this may be done by planing and/or sanding; but the invention is not limited to instances where the butting surfaces are flat. It will be apparent that the surface 18, 19 can and should be prepared to close tolerances. This will insure that the resulting joint will accurately locate the joined elements 10, 11 relative to each other in all possible planes. This accuracy of positioning is not available with the conventional mortise and tenon joint because the butting surfaces of such joints include the shoulder of the mortise which is difficult to prepare within close tolerances.

After the confronting surfaces 18, 19 are prepared, mortises 13 and 14 are cut therein. Conventional mortising tools may be employed. The mortises are preferably cut in positions reference from adjacent surfaces of the elements to be joined and when the elements are placed in final position, they form a cavity having smooth sides and a straight central axis. In joints of the type illustrated in FIGURE 1, the mortises are preferably cut perpendicular to the surfaces 18, 19; however, in angular embodiments of the joint, it may be desirable to cut the mortise at an angle to the abutting surfaces in order to optimize the depth of the cut.

Spline 12 is prepared independently of the mortises, in a manner discussed hereinafter, and it is inserted to complete the joint. The dimensions of the spline are selected to have it nest within the cavity formed by the mortises 13, 14 when the elements 10, 11 are assembled with the butting surfaces 18, 19 in contact. For a firm and permanent joint, adhesive may be applied to the spline and/or to the mortises before the joint is formed. It is possible to avoid the use of adhesive if the respective dimensions of the spline 12 and joined elements 10, 11 are suitably selected, and the joint is force-fitted to form a high friction connection.

The invention uses a blind mortise which can be placed not only in the edges and ends of elements being joined, but also may be placed on the faces of such elements. Thus, there are very few limitations upon the use of the described joint and since it can provide a joint stronger than the materials joined, it is extremely useful irrespective of location.

Figure 2:
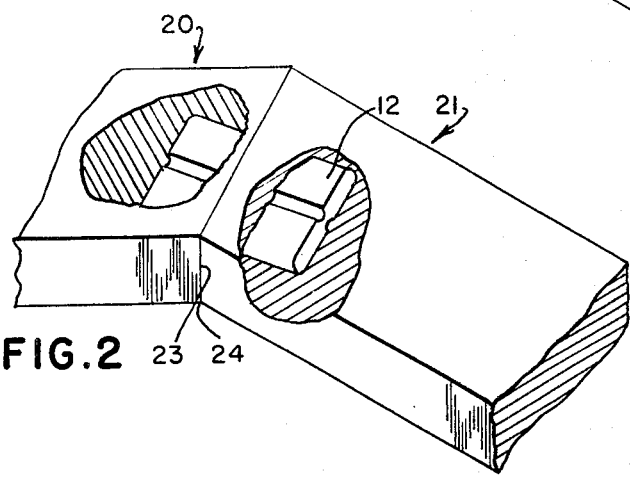
FIGURE 2 is an illustrative drawing partially in cross section of a butt joint in accordance with the invention.

FIGURE 2 illustrates the joining of two elements 20, 21 which are to be finally assembled at an angle to each other. With such joints, the confronting edges 23, 24 of the elements are shaped to provide butting contact when the elements are suitably disposed. The mortises are cut into each face to develop a cavity in the assembled position of the elements that has a linear longitudinal axis. The length and positioning of each mortise is, of course, limited by the dimensions of the elements 20, 21 and the desired assembled position. A particular advantage of the present invention, is the fact that the length of spline 12 can be varied without limit to conform with any of the depth limitations imposed upon the mortises.

The design of the splines used in this invention plays a critical role in the quality, ease, and cost with which joints are formed. In general, with reference to FIGURE 1, the width $a$, height $b$, and length $c$ of each spline is substantially the same as the corresponding width $e$, height $d$, and double depth $2f$ of the mortise cavity. Of course, there is no necessity for making the mortises in each joined element of equal depth, but, this is usually convenient. Obviously, in order to insert the spline 12 into the mortises 13, 14 it must be slightly smaller than the cavity. Furthermore, when an adhesive is used, room must be left in the cavity to accommodate the adhesive. The amount of room left for adhesive will depend both upon the adhesive used and the porosity of the spline 12 and the joined elements 10, 11.

Figure 4:
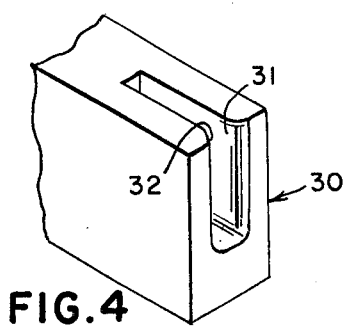
FIGURE 4 is a perspective view of a typical mortise made according to an embodiment of the invention, wherein the upper portion of the member is removed.
Figure 3:
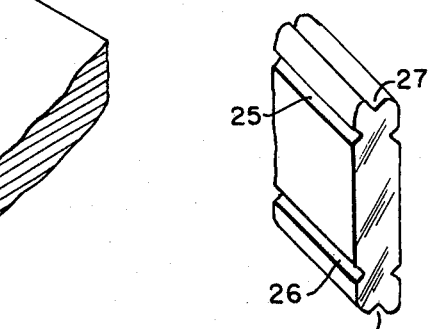
FIGURE 3 is a perspective of a portion of a spline for use in conjunction joints made according to the invention.

An important feature of the spline is the use of grooves therein. In FIGURE 1, the spline 12 is illustrated as having a single longitudinal groove 15 at the center of each side. In FIGURE 4, a portion of another spline is illustrated, wherein there is a pair of longitudinal grooves 25, 26 along each side and further longitudinal grooves 27, 28 along the top and bottom edges. The function of the grooves is two-fold. When the spline is made of a deformable material, such as wood, the grooves permit some resilient compression of the spline which permits the use of slightly oversized splines or slightly undersized mortises. This aspect of the grooves also enhances the friction with which the respective members hold together. The second and perhaps more important function of the grooves is concerned with the use of adhesives.

When the spline is forced into the mortise with a liquid adhesive, the adhesive and any trapped air must be given a vent or the element containing the mortise may be cracked. This is a danger faced when using the prior art mortise and tenon joining method. The grooves on the spline provide the necessary vents and not only protect the elements against cracking, but make insertion of the spline easier. The grooves also provide a discrete volume within the mortise cavity and along the length of the spline within which an adhesive may be retained. The sides of the grooves provide increased surface area for adhesive contact and even if most of the adhesive is squeezed out of the cavity due to intimate contact between the mortise walls and the surface of the spline, enough will be retained in the grooves to insure a good bond. For some uses, rather than using longitudinally positioned grooves, it may be desirable to arrange them in a spiral about the spline, or if venting is considered of minor importance in particular circumstances, transverse grooves may be employed to improve the bonding between the spline and the mortise walls.

The present invention also provides features which appear initially to be contradictory in their effect. As mentioned above, the joints of the invention are self-aligning, that is, when the mortises are properly made, insertion of the spline automatically positions the surfaces of the joined elements in correct registration. This is of great importance when working with materials having pre-finished surfaces that cannot be further modified by planing, sanding, or the like. On the other hand, the joints of the invention also permit last minute modifications when assembling a joint in order to correct for minor misalignments that may have arisen due to imperfectly prepared elements. This too, is of great importance, particularly when the elements are prepared at one location and assembled at another.

FIGURE 4 shows an exaggerated perspective view of the end of a mortised element 30 with the upper portion removed. This view illustrates that the edges 31, 32 of the mortise may be chamfered or beveled. When this is done, the spline may be moved slightly within the mortise cavity in order to permit adjustment of the element from the position that would normally be imposed if the fit was snug. The chamfering of edges 31, 32 also provides an additional space for adhesive when the faces of the joined elements are in butting cutting.

A number of specific embodiment of the invention have been shown and described. It is recognized that with the teachings disclosed and suggested herein, further modifications and improvements may be made by those skilled in the art, and all such arrangements are contemplated.

Throughout the specification, reference has been made to "mortises." It is to be understood that in both the specification and the following claims, this refers to a cavity within the face of the material in which it is formed. Thus, a mortise has completely surrounding walls and at least one opening at the edge of the material into which it is cut.

What I claim is:

1. A butted joint between pieces of material, comprising in combination: a completely enclosed mortise cavity having prescribed linear height, width and depth dimensions formed by the butted faces of said pieces of material; an independent rigid spline positioned in said cavity and having a longitudinal axis adapted to lie parallel to the axis of said cavity, said spline having height, width and length dimensions substantially the same as the height, width and depth of said cavity; the height of said mortise cavity and said spline being substantially greater than the width thereof, and the longitudinal walls of said mortise and the confronting faces of said spline being parallel and continuous; the major faces of said spline being substantially flat and in bearing contact with the walls of said cavity, said spline including at least one longitudinal groove extending from end to end, the walls of said groove terminating at the respective surfaces of the spline.

2. A butted joint according to claim 3, wherein the edges of said mortises are enlarged at said confronting faces.

3. A butted joint according to claim 1, wherein said spline is force-fitted into said mortises.

4. A butted joint according to claim 1, wherein an adhesive is used to bond said spline within said mortises.

5. A butted joint according to claim 1, wherein said spline is composed of a material having deformation characteristics which differ from that of said pieces.

References Cited

UNITED STATES PATENTS

| | | | |
|---|---|---|---|
| 376,236 | 1/1888 | Collins | 287—20.92 |
| 569,235 | 10/1896 | Rockwell | 287—20.92 |
| 667,219 | 2/1901 | Hieronymous | 387—20.92 |
| 798,706 | 9/1905 | Rockwell | 287—20.92 |
| 2,219,197 | 10/1940 | Purtel | 287—20.92 X |
| 2,236,926 | 4/1941 | Surface | 287—20.92 |
| 3,059,291 | 10/1962 | Sherwood. | |
| 3,235,920 | 2/1966 | Davis | 287—20.92 |
| 2,599,994 | 6/1952 | Hirsch | 287—20.92 |

REINALDO P. MACHADO, Primary Examiner

WAYNE L. SHEDD, Assistant Examiner

U.S. Cl. X.R.

52—586; 287—20.92